US008592061B2

(12) United States Patent
Onoue et al.

(10) Patent No.: US 8,592,061 B2
(45) Date of Patent: Nov. 26, 2013

(54) MAGNETIC RECORDING MEDIUM WITH CONTROLLED GRAIN DIAMETERS

(75) Inventors: Takahiro Onoue, Singapore (SG); Akira Shimada, Tokyo (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 843 days.

(21) Appl. No.: 12/443,372

(22) PCT Filed: Sep. 26, 2007

(86) PCT No.: PCT/JP2007/068679
§ 371 (c)(1),
(2), (4) Date: May 4, 2009

(87) PCT Pub. No.: WO2008/038664
PCT Pub. Date: Apr. 3, 2008

(65) Prior Publication Data
US 2010/0039724 A1    Feb. 18, 2010

(30) Foreign Application Priority Data

Sep. 29, 2006 (JP) ................................. 2006-269837

(51) Int. Cl.
*G11B 5/65* (2006.01)
(52) U.S. Cl.
USPC ........ 428/836.2; 428/827; 428/829; 428/830; 428/836.3
(58) Field of Classification Search
None
See application file for complete search history.

(56) References Cited

U.S. PATENT DOCUMENTS

| 6,468,670 | B1 * | 10/2002 | Ikeda et al. | 428/611 |
| 6,602,620 | B1 * | 8/2003 | Kikitsu et al. | 428/842.2 |
| 6,884,521 | B2 * | 4/2005 | Takahashi et al. | 428/832 |
| 7,056,604 | B2 * | 6/2006 | Kanbe et al. | 428/832 |
| 2005/0214591 | A1 * | 9/2005 | Maeda et al. | 428/832 |

FOREIGN PATENT DOCUMENTS

| JP | 07-311929 | 11/1995 |
| JP | 08-007859 B2 | 1/1996 |
| JP | 2001-250222 | 9/2001 |
| JP | 2001-250222 A | 9/2001 |
| JP | 2002-25030 A | 1/2002 |
| JP | 2002-025030 A | 1/2002 |
| JP | 2002-358615 A | 12/2002 |
| JP | 2005-196813 A | 7/2005 |
| JP | 3725132 B2 | 12/2005 |

OTHER PUBLICATIONS

S. H. Liou, et al., "Granular metal films as recording media", Appl. Phys. Lett., Feb. 1988, pp. 512-514, vol. 52, No. 6.

(Continued)

*Primary Examiner* — Kevin Bernatz

(57) ABSTRACT

In order to provide a magnetic recording medium having excellent electromagnetic conversion characteristics, a magnetic recording medium (10) is provided with a substrate (12), and a magnetic recording layer (20) formed on the substrate (12). The magnetic recording layer (20) is provided with a granular layer (32), i.e., a magnetic layer, including magnetic grains and a nonmagnetic material surrounding the magnetic grains in a section parallel to the main surface of the substrate. The ratio of the long diameter to the short diameter of each magnetic grain contained in the granular layer (32) is calculated in the section. In the histogram of such ratio, a half width at half maximum of the histogram is 0.6 or less and the variance of grain diameters of the magnetic grains in the section is 20% or less of the average grain diameter of the magnetic grains.

9 Claims, 7 Drawing Sheets

(56) References Cited

OTHER PUBLICATIONS

T. Oikawa, et al., "Microstructure and Magnetic Properties of CoPtCr-SiO$_2$ Perpendicular Recording Media", IEEE Transactions on Magnetics, Sep. 2002, pp. 1976-1978, vol. 38, No. 5.

Written Opinion dated May 14, 2010 in Singapore patent application No. 200902705-3, 10 pages.

Examination Report dated Jan. 24, 2011 in Singapore patent application No. 200902705-3, 10 pages.

* cited by examiner (a)

(b)

(a)

(b)

(a)

(b)

(c)

MAGNETIC RECORDING MEDIUM WITH CONTROLLED GRAIN DIAMETERS

TECHNICAL FIELD

This invention relates to a magnetic recording medium.

BACKGROUND ART

In recent years, the information-oriented society has been quickly developed and the information recording capacity over 100 Gbytes has been required per 2.5-inch magnetic disk in magnetic recording apparatuses represented by HDDs (hard disk drives). In order to satisfy such a requirement in the magnetic disk, it is necessary to realize an information recording density over 200 Gbits per square inch (200 Gbits/inch$^2$). For performing stable recording/reproduction at such a high recording density, it is generally preferable to employ a perpendicular magnetic recording system as a magnetic recording/reproducing system.

As a magnetic recording medium for use in the perpendicular magnetic recording system, for example, a granular medium is known which exhibits excellent recording characteristics (see, e.g. Non-Patent Document 1). Specifically, the granular medium is provided with a granular layer (Granular layer) having a structure in which magnetic grains are surrounded by a nonmagnetic substance. As the granular medium, there is proposed, for example, a structure in which an oxide such as $SiO_2$ is added to CoCrPt (see, e.g. Non-Patent Document 2).

Further, conventionally, attempts have been made to improve the magnetic properties of granular layers from various aspects (see, e.g. Patent Documents 1 to 4). For example, Patent Document 1 discloses a structure in which the ratio of a nonmagnetic compound occupying the total volume of both a magnetic material and the nonmagnetic compound is about 2% or more and about 30% or less. Patent Document 2 discloses a structure in which a large number of magnetic grains are separated by a grain boundary layer and the average separation distance between the mutually adjacent magnetic grains along a straight line connecting the centers of gravity thereof is 1 nm or more.

Patent Document 3 discloses a structure in which a base material surrounding magnetic crystal grains contains a predetermined combination of elements. Patent Document 4 discloses a structure in which grain boundary regions of magnetic crystal grains contain an oxide of Ti, the substance amount ratio of the oxide of Ti in a magnetic recording layer is 5 mol % or more and 15 mol % or less, and at least TiO and/or $Ti_2O_3$ is contained as the oxide of Ti.

Further, conventionally, there has been proposed a CGC (Coupled Granular and Continuous) medium in which a continuous film layer (Continuous layer) is further provided on a granular layer (see, e.g. Patent Document 5). By providing the continuous film layer, it is possible, for example, to improve the thermal stability of recorded signals.

Non-Patent Document 1: Appl. Phys. Lett. 52(6). 8 Feb. 1988 pp 512-514
Non-Patent Document 2: T. Oikawa et al., IEEE Trans. Magn, vol. 38, 1976-1978 (2002)
Patent Document 1: JP-B-H8-7859
Patent Document 2: JP-A-2002-358615
Patent Document 3: JP-B-3725132
Patent Document 4: JP-A-2005-196813
Patent Document 5: Specification of U.S. Pat. No. 6,468, 670B1

DISCLOSURE OF THE INVENTION

Problem to be Solved by the Invention

In recent years, following the increase in required recording density, there has been required a magnetic recording layer with higher performance. For this purpose, it has been required to find a structure of a magnetic recording layer that can realize higher performance. It is therefore an object of this invention to provide a magnetic recording medium having a magnetic recording layer that can realize higher performance.

Means for Solving the Problem

In order to improve the recording density, it is important to miniaturize magnetic grains with high magnetic anisotropy, to equalize the grain diameters, and to magnetically and physically isolate the individual magnetic grains. Further, it is important that the easy magnetization axis of crystals of the magnetic grains be oriented in a perpendicular direction in low orientation dispersion.

In order to achieve such a fine structure, for example, a granular medium or the like in which an oxide such as $SiO_2$ is added to CoCrPt is considered to be effective. In this case, the easy magnetization axis is the c-axis of Co crystals.

However, when actually forming a magnetic recording layer, it is difficult to form all magnetic grains in an ideal state. In view of this, the inventors of this application have, through experimental studies, considered to control the shapes of magnetic grains by a statistical method and paid attention to the manner of variation in shape of the magnetic grains in a section of a magnetic recording layer. Then, the inventors have found out that particularly excellent magnetic properties can be obtained by setting variation in ratio between a long diameter and a short diameter of each of the magnetic grains and variation in grain diameter of the magnetic grains to values within predetermined ranges, respectively. This invention has the following configurations.

(Configuration 1)

A magnetic recording medium comprising a substrate and a perpendicular magnetic recording layer formed over the substrate, the magnetic recording medium, wherein the perpendicular magnetic recording layer comprises a magnetic layer containing magnetic grains and a nonmagnetic substance surrounding the magnetic grains in a section parallel to a main surface of the substrate, when, in the section, a ratio between a long diameter and a short diameter of each of the magnetic grains contained in the magnetic layer is calculated to derive a histogram of the ratios, a half width at half maximum of the histogram is 0.6 or less, and a variance of grain diameters of the magnetic grains in the section is 20% or less of an average grain diameter of the magnetic grains. The half width at half maximum of the histogram is preferably 0.5 or less and more preferably 0.4 or less. Further, the variance of the grain diameters of the magnetic grains is preferably 15% or less and more preferably 12% or less of the average grain diameter of the magnetic grains.

In order to improve the recording density of the magnetic recording layer, it is necessary to reduce the sizes of the magnetic grains and further to increase the number of magnetic grains per unit volume (grain density). However, in this case, there are instances where the adjacent magnetic grains tend to be coupled together following the increase in grain density, for example, depending on the film forming conditions. And as a result, large magnetic grains are formed.

There is a large possibility that, in the magnetic recording layer, large magnetic grains are formed so as to protrude from the boundaries of write bits where magnetic signals are recorded. Therefore, in this case, the write-bit boundaries each differ from an ideal straight line so that the boundaries between the adjacent bits become unclear.

As a result, when the large magnetic grains are formed, noise caused by irregular magnetization transition increases so that the signal to noise ratio (S/N ratio) being one of electromagnetic conversion characteristic parameters decreases.

In connection with this, the inventors of this application have found that a large magnetic grain formed by coupling of a plurality of magnetic grains has a distorted shape such as, for example, a gourd shape and thus the difference between a long diameter (L) and a short diameter (S) becomes large. Then, the inventors have found that, by setting variation in ratio (L/S) between a long diameter and a short diameter of each of magnetic grains in a section, parallel to a main surface of a substrate, of a magnetic layer included in a magnetic recording layer to fall within the above range, it is possible to improve the S/N ratio. This is considered to be caused by the fact that when the variation in ratio (L/S) is small, large magnetic grains each formed by coupling of a plurality of magnetic grains are small in number and thus the write-bit boundaries each approximate the ideal straight line so that noise caused by irregular magnetization transition decreases.

The inventors of this application have further found that the relationship between the variation in ratio (L/S) and the S/N ratio becomes particularly large when variation in grain diameter itself falls within a predetermined range. For example, when the variation in grain diameter itself is large, even if the variation in ratio (L/S) is small so that the half width at half maximum of a histogram takes a value within the above range, there is a case where the S/N ratio cannot be sufficiently improved. This is considered to be caused by the fact that when the variation in grain diameter itself is large, even if the ratios (L/S) are small, the ratio of large magnetic grains protruding from the write-bit boundaries increases.

In connection with this, by setting the variance of grain diameters of magnetic grains to fall within the above range, variation in grain diameter itself can be properly suppressed. Therefore, if configured like this, the S/N ratio can be properly improved. This makes it possible to provide a magnetic recording medium excellent in electromagnetic conversion characteristic.

If the half width at half maximum of the histogram or the variance of the grain diameters of the magnetic grains deviates from the above range, there is a possibility that the write-bit boundaries each deviate from the ideal straight line and thus noise due to irregular magnetization transition occurs. By this, there is a possibility that the S/N ratio of a magnetic recording medium decreases.

The average radius of magnetic grains is derived by, for example, performing a circle approximation of each of magnetic grains contained in a section and averaging radii of them. The long diameter (L) of a magnetic grain is, for example, a diameter of a circumscribed circle of a closed curve along the sectional shape of the magnetic grain. The short diameter (S) of a magnetic grain is, for example, a diameter of an inscribed circle of a closed curve along the sectional shape of the magnetic grain.

When a plurality of circumscribed circles with different diameters can be drawn as the above circumscribed circle, the long diameter of a magnetic grain is, for example, a diameter of the minimum circumscribed circle among them. On the other hand, when a plurality of inscribed circles with different diameters can be drawn as the above inscribed circle, the short diameter of a magnetic grain is, for example, a diameter of the maximum inscribed circle among them.

Herein, the long diameter (L) always becomes equal to or greater than the short diameter (S). Therefore, the ratio (L/S) always becomes 1 or more. Further, when coupling of a plurality of magnetic grains does not occur, the ratio (L/S) becomes a value close to 1. Therefore, a histogram of ratios (L/S) has a shape in which, for example, it has a peak near a position where the ratio (L/S) becomes 1 and, as the ratio (L/S) increases therefrom, the frequency gradually decreases. Therefore, as a half width at half maximum of this histogram, use can be made of, for example, a value derived by subtracting 1 being a value of the ratio (L/S) corresponding to the peak from a value of the ratio (L/S) where the frequency becomes half of the peak.

With respect to a magnetic grain, parameters such as a radius obtained when a circle approximation is performed, a long diameter, and a short diameter can be obtained by, for example, observing a sectional image of the magnetic grain. For observing the sectional image, use can be made of, for example, a transmission electron microscope (TEM). According to the transmission electron microscope, it is possible to observe a magnetic grain on the order of nanometers and thus these parameters can be calculated from the shape of a substrate-direction sectional image (a sectional image based on a section parallel to a main surface of a substrate) of the magnetic grain.

The magnetic layer in the magnetic recording layer is, for example, a granular layer having a structure in which magnetic grains are surrounded by a nonmagnetic substance so that the magnetic grains are separated from each other. This magnetic layer is formed by, for example, a sputtering method that causes Ar ions to impinge on an alloy target. As this alloy target, use is made of, for example, a target having a structure in which a nonmagnetic oxide being the above nonmagnetic substance is mixed into a Co-based ferromagnetic material alloy.

(Configuration 2)

The half width at half maximum of the histogram is 0.1 to 0.6, and the variance of the grain diameters of the magnetic grains is 5 to 20% of the average grain diameter. The half width at half maximum of the histogram is preferably 0.2 to 0.5 and more preferably 0.3 to 0.4. The variance of the grain diameters of the magnetic grains is preferably 7 to 15% of the average grain diameter of the magnetic grains and more preferably 9 to 12% or less.

With this configuration, it is possible to properly improve the S/N ratio of the magnetic recording medium. Further, for example, as compared with a case of attempting, more than required, to achieve an ideal state where the half width at half maximum of the histogram and the variance of the grain diameters are both zero, the manufacturing cost can be reduced. Therefore, with this configuration, it is possible to properly provide a magnetic recording medium excellent in electromagnetic conversion characteristic.

(Configuration 3)

The average grain diameter of the magnetic grains in the section is 3 to 8 nm. The average grain diameter of the magnetic grains is preferably 4 to 6 nm.

When the average grain diameter of the magnetic grains falls within this range, it is possible to particularly properly improve the S/N ratio of the magnetic recording medium by using as indices the half width at half maximum of the histogram and the variance of the grain diameters of the magnetic grains. Therefore, with this configuration, it is possible to properly provide a magnetic recording medium excellent in electromagnetic conversion characteristic.

(Configuration 4)

The magnetic recording layer contains the magnetic grains at the rate of 100 to 150 grains per region of 100 nm×100 nm in the section. The number of magnetic grains per region of 100 nm×100 nm is preferably 100 to 120.

When the grain density of the magnetic grains is greater than this range, there is a possibility that separation between the magnetic grains becomes insufficient and thus coupling of a plurality of magnetic grains tends to occur. In this case, there is a possibility that the ratio of magnetic grains each having a large ratio (L/S) increases and thus the half width at half maximum of the histogram increases. By this, there is a possibility that the S/N ratio of the magnetic recording medium decreases. On the other hand, when the grain density of the magnetic grains is smaller than this range, there is a possibility that the magnetic grains become too small in number and thus magnetization per bit in magnetic recording becomes insufficient.

On the other hand, in the case of Configuration 4, since the grain density of the magnetic grains falls within the proper range, the half width at half maximum of the histogram and the variance of the grain diameters of the magnetic grains described above can be easily realized. Therefore, with this configuration, it is possible to properly improve the S/N ratio of the magnetic recording medium. By this, it is possible to properly provide a magnetic recording medium excellent in electromagnetic conversion characteristic.

(Configuration 5)

A width of a region occupied by the nonmagnetic substance between the magnetic grains is 0.8 to 1.3 nm. The width of the region occupied by the nonmagnetic substance is, for example, a width of the grain boundary of the magnetic grains in the magnetic layer. The width of the region occupied by the nonmagnetic substance is preferably 0.9 to 1.1 nm.

When the width of the region occupied by the nonmagnetic substance is small, there is a possibility that separation between the magnetic grains becomes insufficient and thus coupling of a plurality of magnetic grains tends to occur. In this case, there is a possibility that the ratio of magnetic grains each having a large ratio (L/S) increases and thus the half width at half maximum of the histogram increases. By this, there is a possibility that the S/N ratio of the magnetic recording medium decreases. On the other hand, when the width of the region occupied by the nonmagnetic substance is large, the grain density of the magnetic grains decreases and thus there is a possibility that magnetization per bit in magnetic recording becomes insufficient.

On the other hand, in the case of Configuration 5, since the width of the region occupied by the nonmagnetic substance falls within the proper range, the half width at half maximum of the histogram and the variance of the grain diameters of the magnetic grains described above can be easily realized. Therefore, with this configuration, it is possible to properly improve the S/N ratio of the magnetic recording medium. By this, it is possible to properly provide a magnetic recording medium excellent in electromagnetic conversion characteristic.

(Configuration 6)

A density of said nonmagnetic substance is 2.4 g/cm$^3$ or more. The density of the nonmagnetic substance is preferably 3.0 g/cm$^3$ or more and more preferably 4.0 g/cm$^3$ or more (e.g. 4.0 to 4.5 g/cm$^3$).

When forming the magnetic layer of the magnetic recording layer, high crystal orientation and formation of mutually separated grains can both be achieved by, for example, using an underlayer of Ru with high lattice matching with Co used as magnetic grains and a seed layer for facilitating orientation of Ru.

However, when forming a film containing a large number of crystal grains, if the grains crystal-oriented in the same direction approach each other, the grains tend to be united together. Therefore, when attempting to form grains aligned in orientation, coarse grains tend to be formed. Accordingly, in general consideration, it can be said that it is difficult to achieve both high crystal orientation and formation of mutually separated (isolated) grains. Thus, what substance is to be used as a nonmagnetic substance for surrounding magnetic grains is an important problem.

With respect to this nonmagnetic substance, the inventors of this application have, through experimental studies, considered that a new approach different from conventional ones is necessary for further enhancing the electromagnetic conversion characteristics of a magnetic recording layer, and paid attention to the density of a nonmagnetic substance.

Then, the inventors have found that when a nonmagnetic substance with a low density is used, magnetic grains each having a large ratio (L/S) tend to be formed. Further, the inventors have found that it is effective to use a nonmagnetic substance with a certain or higher density for suppressing coupling of magnetic grains in a lateral direction parallel to a main surface of a substrate.

Using such a nonmagnetic substance, even if magnetic grains approach each other in the film growth of a magnetic layer, it is possible to effectively prevent a magnetic material such as, for example, Co from diffusing between the magnetic grains. Therefore, with this configuration, it is possible to facilitate formation of mutually separated magnetic crystal grains. Further, this makes it possible to properly increase a coercive force of the magnetic layer.

Further, in this case, since coupling between the magnetic grains hardly occurs, magnetic grains each having a large ratio (L/S) are hardly formed. Therefore, the half width at half maximum of the histogram becomes small. Accordingly, with this configuration, it is possible to properly improve the S/N ratio of the magnetic recording medium. By this, it is possible to properly provide a magnetic recording medium excellent in electromagnetic conversion characteristic.

As such a nonmagnetic substance, use can be made of, for example, $SiO_2$, $TiO_2$, or the like. In terms of facilitating separation between magnetic grains, it is more preferable to use an oxide with a density higher than that of $SiO_2$, such as, for example, $TiO_2$. With this configuration, for example, an oxide film formed between the magnetic grains becomes dense and thus the magnetic layer can be a dense film. Therefore, it is possible to more properly prevent a magnetic material such as, for example, Co from diffusing between the magnetic grains. This makes it possible to facilitate separation and isolation of the magnetic grains. Therefore, with this configuration, it is possible to more properly improve the S/N ratio of the magnetic recording medium.

Conventionally, when selecting a nonmagnetic substance for use in, for example, a granular medium, selection of a material is made in terms of, for example, tendency to formation of an oxide analogized from the Gibbs free energy. On the other hand, the inventors of this application, as different from conventional, have paid attention to diffusion tendency of a magnetic material (Co or the like) during formation of a magnetic layer and take a viewpoint that, by preventing diffusion thereof, it is possible to suppress coarsening of magnetic grains. With Configuration 6, the magnetic layer can be formed while properly controlling the shapes of the magnetic grains.

(Configuration 7)

The perpendicular magnetic recording layer further comprises a first magnetic layer which forms the magnetic layer containing the magnetic grains and the nonmagnetic substance surrounding the magnetic grains and a second magnetic layer containing magnetic grains with grain boundaries each having a width of less than 0.8 nm.

When using, as the magnetic recording layer, only the magnetic layer (first magnetic layer) containing the nonmagnetic substance surrounding the magnetic grains, if, for example, the width of the region occupied by the nonmagnetic substance is large, there is a case where the reversed domain nucleation magnetic field Hn of the magnetic recording layer becomes small so that the thermal stability of magnetic recording decreases. On the other hand, with this configuration, it is possible to properly increase the reversed domain nucleation magnetic field Hn of the magnetic recording layer by forming the second magnetic layer in which the width of each grain boundary is small. This makes it possible to properly increase the thermal stability of magnetic recording.

Further, in this case, the magnetic grains can be sufficiently separated from each other in the first magnetic layer by sufficiently ensuring the width of the region occupied by the nonmagnetic substance. Therefore, the half width at half maximum of the histogram and the variance of the grain diameters of the magnetic grains described above can be easily realized. Accordingly, with this configuration, it is possible to more properly improve the S/N ratio of the magnetic recording medium. By this, it is possible to properly provide a magnetic recording medium excellent in electromagnetic conversion characteristic.

(Configuration 8)

A method of evaluating a granular layer including magnetic grains to attain a signal-to-noise ratio, comprising obtaining ratios between long diameters and short diameters of the magnetic grains; and statistically processing the ratios between the long and the short diameters to evaluate the signal-to-noise ratio of the granular layer.

(Configuration 9)

The statistical processing comprises obtaining histgrams of ratios; calculating a half width of half maximum of the histgrams; and judging the signal-to-noise ration from the half width of the half maximum of the histgrams.

Effect of the Invention

According to this invention, it is possible to provide, for example, a magnetic recording medium excellent in electromagnetic conversion characteristic.

BEST MODE FOR CARRYING OUT THE INVENTION

Hereinbelow, embodiments according to this invention will be described with reference to the drawings. FIG. 1 shows one example of a structure of a magnetic recording medium 10 according to one embodiment of this invention. FIG. 1(a) is a sectional view showing the structure of the magnetic recording medium 10. FIG. 1(b) is a sectional view showing a detailed structure of a continuous film layer 36 in the magnetic recording medium 10. The magnetic recording medium 10 is a perpendicular magnetic recording medium for a perpendicular magnetic recording system and comprises a substrate 12, an adhesive layer 14, a soft magnetic layer 16, an underlayer 18, a magnetic recording layer 20, a protective layer 22, and a lubricating layer 24. In this example, the information recording density of the magnetic recording medium 10 is 200 Gbits per square inch (200 Gbits/inch$^2$) or more, for example, 200 to 500 Gbits/inch$^2$.

The substrate 12 is a glass substrate (disk base) of aluminosilicate glass, aluminoborosilicate glass, soda-lime glass, or the like. It is particularly preferable to use the substrate of aluminosilicate glass as the substrate 12. For example, when magnetic field annealing is necessary for controlling magnetic domains of the soft magnetic layer 16, it is particularly preferable to use the substrate 12 of glass. Since the substrate 12 of glass is excellent in heat resistance, the heating temperature of the substrate 12 can be set high.

As the glass for the substrate 12, an amorphous glass or a crystallized glass can be used. For example, when the soft magnetic layer 16 has an amorphous structure, it is preferable to use a substrate of amorphous glass as the substrate 12. Use of a chemically strengthened glass is preferable because the rigidity is high.

The surface roughness of the main surface of the substrate 12 is preferably set to 4 nm or less in Rmax and 0.6 nm or less in Ra. By providing such a smooth surface, a gap between the magnetic recording layer 20 and the soft magnetic layer 16 can be set constant so that it is possible to form a suitable magnetic circuit across a head (magnetic head), the magnetic recording layer 20, and the soft magnetic layer 16.

The adhesive layer 14 is a layer formed between the substrate 12 and the soft magnetic layer 16 for improving the adhesion of the soft magnetic layer 16 with respect to the substrate 12. Using the adhesive layer 14, it is possible to prevent stripping of the soft magnetic layer 16. As a material of the adhesive layer 14, use can be made of, for example, a Ti-containing material. In terms of practical use, the thickness of the adhesive layer 14 is preferably set to 1 to 50 nm.

The soft magnetic layer 16 is a layer for forming a magnetic circuit between itself and the head through the magnetic recording layer 20. The soft magnetic layer 16 is not particularly limited as long as it is made of a magnetic substance that exhibits soft magnetic properties and, for example, preferably has as a magnetic property a coercive force (Hc) of 0.01 to 80 oersteds and more preferably 0.01 to 50 oersteds. Further, it preferably has as a magnetic property a saturation magnetic flux density (Bs) of 500 to 1920 emu/cc.

As a material of the soft magnetic layer 16, there can be cited, for example, an Fe-based material, a Co-based material, or the like. For example, use can be made of an Fe-based soft magnetic material such as FeTaC-based alloy, FeTaN-based alloy, FeNi-based alloy, FeCoB-based alloy, or FeCo-based alloy, a Co-based soft magnetic material such as CoTaZr-based alloy or CoNbZr-based alloy, an FeCo-based alloy soft magnetic material, or the like.

The thickness of the soft magnetic layer 16 is, for example, 5 to 1000 nm and preferably 20 to 150 nm. When the thickness is less than 5 nm, there is a case where it becomes difficult to form a suitable magnetic circuit across the head, the magnetic recording layer 20, and the soft magnetic layer 16. On the other hand, when the thickness exceeds 1000 nm, there is a case where the surface roughness increases. Further, when the thickness exceeds 1000 nm, there is a case where the sputtering film formation becomes difficult.

The underlayer 18 is a layer for controlling the crystal structure of the magnetic recording layer 20 and is made of, for example, Ru. The underlayer 18 may be a laminated film of a plurality of kinds of films.

The magnetic recording layer 20 is a perpendicular magnetic recording layer and comprises a granular layer 32, a coupling control layer 34, and a continuous film layer 36. The granular layer 32 and the coupling control layer 34 are layers that become necessary when a reversed domain nucleation magnetic field Hn of the magnetic recording layer 20 is insufficient only with the granular layer 32. When the reversed domain nucleation magnetic field Hn becomes sufficient only with the granular layer 32, the coupling control layer 34 and the continuous film layer 36 may be omitted.

The granular layer 32 is one example of a first magnetic layer and is a layer of a granular structure in which a metal oxide being a nonmagnetic substance is segregated at grain boundaries of miniaturized magnetic grains (magnetic crystal grains). With this structure, the individual magnetic grains are magnetically and spatially separated from each other by the nonmagnetic substance in the granular layer 32.

As the granular layer 32, use can be made of, for example, a layer (CoCrPt—$TiO_2$ layer) in which $TiO_2$ being a nonmagnetic substance is precipitated at grain boundaries of CoCrPt crystals being magnetic grains. Silicon oxide such as $SiO_2$ can be used as a nonmagnetic substance instead of $TiO_2$. Alternatively, use may be made of another metal oxide or the like.

Given that a metal contained in a metal oxide in the granular layer 32 is X, the content of the metal oxide $XO_y$ is, for example, 5 to 20 at % and preferably 8 to 14 at %. The thickness of the granular layer 32 is, for example, 3 to 20 nm, preferably 8 to 16 nm, and more preferably 7 to 15 nm. The granular layer 32 is preferably formed by a reactive sputtering method in an oxygen atmosphere. This makes it possible to properly form suitably-shaped magnetic grains.

The coupling control layer 34 is a layer for controlling the strength of magnetic coupling between the granular layer 32 and the coupling control layer 34. In this example, the coupling control layer 34 is, for example, a Pd layer of an fcc crystal structure. The thickness of the coupling control layer 34 is, for example, 2 nm or less and is, for example, 0.5 to 1.5 nm and preferably 0.7 to 1.0 nm. The coupling control layer 34 may be a Pt layer.

The continuous film layer 36 is a layer in which magnetic exchange coupling in a direction parallel to the main surface of the substrate 12 continuously extends. In the direction parallel to the main surface of the substrate 12, magnetic grains of the continuous film layer 36 are exchange-coupled to each other with a coupling force greater than that between the magnetic grains of the granular layer 32. Further, the magnetic grains of the continuous film layer 36 are magnetically exchange-coupled to the magnetic grains of the granular layer 32. By this, the continuous film layer 36 controls the magnetic exchange energy between the magnetic grains of the granular layer 32. Further, with this configuration, magnetization of the continuous film layer 36 is pinned by magnetization of the granular layer 32, thereby increasing the reversed domain nucleation magnetic field Hn of the magnetic recording layer 20. Therefore, with this configuration, it is possible to improve the thermal stability of recorded signals. The thickness of the continuous film layer 36 is, for example, 1 to 5 nm, preferably 3 to 5 nm, and more preferably 3 to 4 nm.

A ratio A/B between a thickness A of the granular layer 32 and a thickness B of the continuous film layer 36 is, for example, 2 to 5 and preferably 3 to 4. With this configuration, suitable perpendicular magnetic recording characteristics can be exhibited by the exchange coupling of both layers. A magnetic anisotropy constant (maximum anisotropy energy) Ku of the continuous film layer 36 is, for example, preferably greater than that of the soft magnetic substance. With this configuration, it is possible to reduce the width of domain walls formed in the continuous film layer 36. The magnetic anisotropy constant Ku of the continuous film layer 36 may be smaller than that of the granular layer 32. A coercive force Hc of a material forming the continuous film layer 36 may be, for example, smaller than that of the material forming the magnetic grains of the granular layer 32.

In this example, the continuous film layer 36 is a multilayer film in which magnetic layers 106 and nonmagnetic layers 108 are alternately laminated by about three layers (e.g. two or three layers) for each. The magnetic layer 106 is one example of a second magnetic layer and is, for example, a CoCr layer containing magnetic grains of CoCr. The magnetic layer 106 contains, for example, magnetic crystal grains of CoCr of an hcp crystal structure. In the magnetic layer 106, the width of each of grain boundaries of the magnetic grains is less than 0.8 nm. The thickness of the magnetic layer 106 is, for example, 0.1 to 1 nm, preferably 0.2 to 0.5 nm, and more preferably 0.3 to 0.4 nm. When the magnetic layer 106 is extremely thin as described above, magnetic grains contained in the magnetic layer 106 are not required to have a crystal structure.

The nonmagnetic layer 108 is, for example, a nonmagnetic Pd layer of an fcc crystal structure. The thickness of the nonmagnetic layer 108 is, for example, about 0.8 nm. When configured in this manner, interface magnetic anisotropy is generated at the interface between the magnetic layer 106 and the nonmagnetic layer 108. By stacking the layers 106 and 108, for example, by three layers for each, it is possible to obtain necessary perpendicular magnetic anisotropy. Therefore, by forming the continuous film layer 36 as the multilayer film like in this example, it is possible to reduce the thickness of the continuous film layer 36.

The continuous film layer 36 may have a CoB layer as the magnetic layer 106. The continuous film layer 36 may have, for example, a Pt layer as the nonmagnetic layer 108. The continuous film layer 36 may be a laminated film [CoX/Pd or Pt]n in which layers of a Co compound and Pd layers or Pt layers are alternately laminated by n layers for each. In this case, the CoB layer or CoX layer becomes a layer corresponding to the second magnetic layer.

Alternatively, the continuous film layer 36 may be, for example, a single-layer film with high Pt content. In this case, the continuous film layer 36 becomes a layer corresponding to the second magnetic layer. The continuous film layer 36 may be a single-layer film of, for example, CoCrPt, CoPt, CoPd, FePt, $CoPt_3$, $CoPd_3$, amorphous TbFeCoCr, $SmCo_5$, $Nd_2Fe_{14}B$, $Co_{20}Pt_{80}$, or the like.

The protective layer 22 and the lubricating layer 24 are further formed on the continuous film layer 36. The protective layer 22 is a layer for protecting the magnetic recording layer 20 from an impact of the head. The protective layer 22 is, for example, a carbon-based film of a diamond-like structure. The lubricating layer 24 is a layer for increasing lubricity between the head and the magnetic recording medium 10. The lubricating layer 24 is, for example, a film of PFPE (perfluoropolyether) formed by a dip coating method.

In the manufacturing processes of the magnetic recording medium 10, the respective layers from the adhesive layer 14 to the continuous film layer 36 are each preferably formed by a sputtering method. Particularly, a DC magnetron sputtering method is preferable because uniform film formation is enabled. On the other hand, the protective layer 22 is preferably formed by a CVD method. A carbon-based film formed by the CVD method is improved in film hardness as compared with that formed by the sputtering method. Therefore, by forming the protective layer 22 by the CVD method, it is possible to properly protect the magnetic recording layer 20 against an impact from the head.

FIG. 2 shows examples each of a section of a granular layer 32 taken along the plane parallel to a main surface of a substrate 12. The following section photographs (plane-section TEM photographs) are photographs (TEM photographs) taken by a transmission electron microscope (TEM).

FIG. 2(a) is a first example of a section photograph of the granular layer 32. This section photograph is a section photograph of the granular layer 32 in a magnetic recording medium 10 according to Example 1 which will be described later. In Example 1, a nonmagnetic substance of the granular layer 32 is $TiO_2$. In this case, the density of the nonmagnetic substance is 4.2 g/cm$^3$.

FIG. 2(b) is a second example of a section photograph of the granular layer 32. This section photograph is a section photograph of the granular layer 32 in a magnetic recording medium 10 according to Example 4 which will be described later. In Example 4, a nonmagnetic substance of the granular layer 32 is $SiO_2$. In this case, the density of the nonmagnetic substance is 2.45 g/cm$^3$.

In order to observe magnetic grains using the transmission electron microscope, it is necessary to reduce the thickness of a sample to, for example, about 10 nanometers. This sample preparation can be performed by, for example, grinding called ion milling. More specifically, for example, a magnetic layer (granular layer 32) being an observation object in the magnetic recording medium 10 is conically ion-ground from its upper and lower sides by ion milling and then observation can be carried out using a portion having a sufficiently reduced thickness. The resolution of the transmission electron microscope is determined by focusing of an electromagnetic lens and the wavelength of electrons, but, since the grain diameter of each magnetic grain is several nanometers, it is sufficient for the observation.

As images observed by the transmission electron microscope, there are an image by dark field observation and an image by bright field observation. The dark field observation uses only interference waves of electrons transmitted through a sample by moving an objective aperture in the microscope. In this observation method, it becomes bright at a portion where the sample is present, and dark at a portion where the sample is not present. On the other hand, the bright field observation uses only electrons transmitted through an objective aperture among electrons transmitted through a sample. In this observation method, it becomes dark at a portion where the sample is present, as opposite to the dark field observation.

Since probe electrons are subjected to diffraction due to electrons in atoms, the probe electrons are more diffracted as the electron density in each atom increases, i.e. when the atoms are heavy atoms. Therefore, in the bright field observation, it becomes dark at a portion where heavy atoms are present in large number and is brightly observed at a portion where light elements are present in large number. In an observed image, portions occupied by magnetic grains can be confirmed by performing X-ray analysis on a sample and making collation with the results thereof.

Images shown in FIG. 2 are images of magnetic grains observed by the bright field observation. Since the ratio of light elements is large at nonmagnetic portions as compared with the magnetic grains, the magnetic grains are observed thick in contrast and the nonmagnetic portions are observed thin in contrast.

FIG. 3 is trace diagrams of the section photographs shown in FIG. 2. FIG. 3(a) is a diagram tracing the profiles of the magnetic grains in part of the section photograph shown in FIG. 2(a). FIG. 3(b) is a diagram tracing the profiles of the magnetic grains in part of the section photograph shown in FIG. 2(b). FIG. 3(c) is a diagram for explaining a long diameter (L) and a short diameter (S) of a magnetic grain in the section and is obtained by enlarging a portion of the trace diagram shown in FIG. 3(b). In order to define the shapes of the magnetic grains, the longest diagonal is given as a long diameter (L) and the shortest diagonal is given as a short diameter (S) with respect to each of the magnetic grains in the section. In this case, the long diameter (L) of the magnetic grain is a diameter of a circumscribed circle of a closed curve along the sectional shape of the magnetic grain, while, the short diameter (S) of the magnetic grain is a diameter of an inscribed circle of the closed curve along the sectional shape of the magnetic grain.

As the value of a ratio (L/S) between the long diameter (L) and the short diameter (S) approaches 1, it represents that the magnetic grain in the section approaches a true circle. Hereinbelow, this ratio (L/S) will be used as a numerical value that defines the shape of a magnetic grain, thereby evaluating the magnetic properties of the magnetic recording medium 10. To this end, the ratios (L/S) are statistically processed in the following manner.

FIG. 4 is histograms each of distribution of ratios (L/S). FIG. 4(a) is a histogram with respect to the section of the granular layer 32 shown in FIG. 2(a). The half width at half maximum of this histogram is 0.21. FIG. 4(b) is a histogram with respect to the section of the granular layer 32 shown in FIG. 2(b). The half width at half maximum of this histogram is 0.52.

When the half width at half maximum of the histogram of ratios (L/S) takes such a value, large magnetic grains each formed by a plurality of magnetic grains coupled together are small in number in the section of the granular layer 32 and thus the write-bit boundaries each approximate the ideal straight line. Therefore, with this configuration, it is possible, for example, to reduce noise caused by irregular magnetization transition to thereby improve the S/N ratio of the magnetic recording medium 10.

Particularly, when $TiO_2$ is used as the nonmagnetic substance as in the configuration shown in FIG. 2(a), it is possible to form the granular layer 32 containing more magnetic grains close to a circular shape. Further, even when the distance between the magnetic grains decreases, coupling therebetween hardly occurs and thus the magnetic grains can be properly separated from each other physically. Therefore, in this case, the half width at half maximum of the histogram becomes smaller. Further, by this, the write-bit boundaries each more approximate the ideal straight line and thus it is possible to further improve the S/N ratio of the magnetic recording medium 10. Further, the reversed domain nucleation magnetic field Hn of the magnetic recording layer also becomes higher.

Herein, in the section of the granular layer 32 taken along the plane parallel to the main surface of the substrate 12, the half width at half maximum of the histogram is, for example, 0.1 to 0.6, preferably 0.2 to 0.5, and more preferably 0.3 to 0.4. With this configuration, it is possible to properly improve the S/N ratio of the magnetic recording medium 10.

On the other hand, the variance of grain diameters of the magnetic grains is, for example, 5 to 20% of the average grain diameter, preferably 7 to 15% of the average grain diameter of the magnetic grains, and more preferably 9 to 12% or less. The average grain diameter of the magnetic grains is 3 to 8 nm and preferably 4 to 6 nm. The grain density of the magnetic grains is, for example, 100 to 150 grains and preferably 100 to 120 grains per region of 100 nm×100 nm.

The width of a region occupied by the nonmagnetic substance between the magnetic grains is 0.8 to 1.3 nm and preferably 0.9 to 1.1 nm. The density of the nonmagnetic substance is 2.4 g/cm³ or more, preferably 3.0 g/cm³ or more, and more preferably 4.0 g/cm³ or more (e.g. 4.0 to 4.5 g/cm³). With this configuration, for example, the write-bit boundaries each can more approximate the ideal straight line. Further, by this, it is possible to further improve the S/N ratio of the magnetic recording medium 10.

As the nonmagnetic substance, it is considered to use a substance having a higher density. As such a substance, there can be cited, for example, ZnO (density 5.68 g/cm³), BaO (density 5.72 g/cm³), $Bi_2O_3$ (density 8.9 g/cm³), $Cr_3O_4$ (density 6.1 g/cm³), CuO (density 6.31 g/cm³), $HfO_2$ (density 9.68 g/cm³), $MoO_2$ (density 6.47 g/cm³), $NbO_2$ (density 5.9 g/cm³), $ReO_2$ (density 11.4 g/cm³), $RuO_2$ (density 7.05 g/cm³), $Ta_2O_5$ (density 8.2 g/cm³), $WO_2$ (density 10.8 g/cm³), or the like.

Hereinbelow, this invention will be described in further detail by Examples and Comparative Examples.

EXAMPLE 1

An amorphous aluminosilicate glass is molded into a disk shape by direct press, thereby producing a glass disk. This glass disk is ground, polished, and chemically strengthened in sequence, thereby obtaining a substrate 12 being a smooth nonmagnetic disk base in the form of a chemically strengthened glass disk. The surface roughness of the main surface of the substrate 12 is, when measured by an AFM (atomic force microscope), a smooth surface shape with Rmax of about 3 nm and Ra of about 0.25 nm. Rmax and Ra follow Japanese Industrial Standard (JIS).

Subsequently, using an evacuated film forming apparatus, an adhesive layer 14 up to a continuous film layer 36 are formed in sequence on the substrate 12 in an Ar atmosphere by a DC magnetron sputtering method.

In this event, the adhesive layer 14 is formed using a Ti alloy target so as to be a Ti alloy layer of 10 nm. The soft magnetic layer 16 is formed using a CoTaZr target so as to be an amorphous CoTaZr layer of 50 nm. Further, as the underlayer 18, a Pt layer is first formed to 3 nm and a Ru layer with a thickness of 10 to 20 nm is formed thereon.

Then, the granular layer 32 in the form of a CoCrPt—$TiO_2$ layer having an hcp crystal structure is formed using a hard magnetic target made of CoCrPt—$TiO_2$. Further, the coupling control layer 34 in the form of a Pd layer and the continuous film layer 36 in the form of $[CoB/Pd]_3$ layers are formed in a low Ar gas pressure atmosphere. In the continuous film layer 36, the thickness of each of the CoB layers being magnetic layers 106 is set to 0.35 nm and the thickness of each of the Pd layers being nonmagnetic layers 108 is set to 0.8 nm.

Further, as a protective layer 22, a carbon-based film of a diamond-like structure is formed by a CVD method while maintaining the vacuum of the film forming apparatus. Thereafter, a lubricating layer 24 of PFPE (perfluoropolyether) is formed by a dip coating method. The thickness of the lubricating layer 24 is set to about 1 nm.

Through the manufacturing processes described above, a magnetic recording medium 10 according to Example 1 is fabricated. For transmission electron microscope (TEM) observation of a granular layer 32, a magnetic recording medium not formed with a coupling control layer 34 or a continuous film layer 36 is also fabricated.

Using as indices various parameters of the shapes of magnetic grains in a section parallel to the main surface of the substrate 12, the film forming conditions of the granular layer 32 are properly adjusted so that such various parameters take values within predetermined ranges, respectively. This adjustment is carried out by, for example, observing, using the transmission electron microscope, a section of a granular layer 32 of a magnetic recording medium 10 fabricated by way of trial and properly changing the film forming conditions by feedback of observation results. As various parameters of the shapes of magnetic grains, use is made of numerical values such as, for example, the half width at half maximum of a histogram of ratios (L/S) each between a long diameter (L) and a short diameter (S) of a magnetic grain, the variance of grain diameters of magnetic grains, the average grain diameter of magnetic grains, the grain density of magnetic grains, and the width of a region occupied by a nonmagnetic substance between magnetic grains.

EXAMPLE 2

A magnetic recording medium 10 according to Example 2 is fabricated in the same manner as in Example 1.

EXAMPLE 3

A magnetic recording medium 10 according to Example 3 is fabricated in the same manner as in Example 1 except that $SiO_2$ is used as a nonmagnetic substance of a granular layer 32.

EXAMPLE 4

A magnetic recording medium 10 according to Example 4 is fabricated in the same manner as in Example 3.

(Evaluation)

With respect to Examples 1 to 4, histograms of ratios (L/S) are produced to calculate half widths at half maximum thereof. Further, the S/N ratio is evaluated as electromagnetic conversion characteristics of each magnetic recording medium 10. The S/N ratio is evaluated by actually recording and reading a signal of a predetermined pattern to measure noise.

FIG. 5 shows histograms of ratios (L/S) in the respective Examples. Table 1 shows half widths at half maximum calculated from the histograms of the respective Examples and values of noise as S/N ratio evaluation results. A smaller value of noise represents a higher, i.e. better, S/N ratio. It can be said that when the value of noise is 350 µV or less, the S/N ratio is good and, when it is 200 µV or less, the S/N ratio is particularly good.

TABLE 1

|  | Half Width at Half Maximum | Noise (µV) |
| --- | --- | --- |
| Example 1 | 0.21 | 173 |
| Example 2 | 0.29 | 187 |
| Example 3 | 0.44 | 223 |
| Example 4 | 0.52 | 319 |

As seen from Table 1, the half widths at half maximum are 0.6 or less and good S/N ratios are realized in all the Examples. Further, in Examples 1 and 2 using $TiO_2$ as the nonmagnetic substance, the half widths at half maximum are 0.3 or less and particularly good S/N ratios are realized. This is considered to be caused by the fact that when use is made of $TiO_2$ with a density about twice that of $SiO_2$, the granular layer 32 becomes a dense film, i.e. an oxide film formed between the magnetic grains becomes dense, and thus Co diffusion between the magnetic grains is suppressed so that separation and isolation of the magnetic grains are facilitated.

EXAMPLE 5

An amorphous aluminosilicate glass is molded into a disk shape by direct press, thereby producing a glass disk. This glass disk is ground, polished, and chemically strengthened in sequence, thereby obtaining a smooth nonmagnetic disk substrate in the form of a chemically strengthened glass disk. This glass substrate is a 2.5-inch magnetic-disk substrate with a diameter of 65 mm, an inner diameter of 20 mm, and a disk thickness of 0.635 mm. The surface roughness of the obtained glass substrate is, when measured by an AFM (atomic force microscope), a smooth surface shape with Rmax of 2.18 nm and Ra of 0.18 nm. Rmax and Ra follow Japanese Industrial Standard (JIS).

Then, an adhesive layer 112, a soft magnetic layer 114, an orientation control layer 116, an underlayer 118, and a main recording layer 124 are formed in sequence on the disk substrate 110 by DC magnetron sputtering (see FIG. 6).

First, the adhesive layer 112 is formed using a CrTi target so as to be a CrTi layer of 10 nm.

Then, soft magnetic layers 114a, c are formed so as to be amorphous FeCoTaZr layers each of 30 nm. A nonmagnetic spacer layer 114b is formed as a Ru layer of 1 nm.

Then, the orientation control layer 116 of 10 nm made of NiW, the underlayer 118 with a thickness of 20 nm made of Ru, the main recording layer 124 of CoCrPt—$TiO_2$, a continuous layer 126, and a medium protective layer 128 are formed in sequence on the soft magnetic layer 114.

The main recording layer (granular layer) 124 is formed using a hard magnetic target of 12 nm made of CoCrPt—$TiO_2$ of an hcp crystal structure. Further, the continuous layer 126 is formed using a CoCrPtB target of 7.5 nm (see FIG. 6).

Next to the continuous layer 128, the medium protective layer 128 of hydrogenated carbon is formed by a CVD method (see FIG. 6). Since the film hardness is improved in the form of hydrogenated carbon, it is possible to protect the perpendicular main recording layer against an impact from a magnetic head.

Thereafter, a lubricating layer 130 of PFPE (perfluoropolyether) is formed by a dip coating method (see FIG. 6). The thickness of the lubricating layer 130 is 1 nm.

Through the manufacturing processes described above, a perpendicular magnetic recording medium according to Example 5 is fabricated. For transmission electron microscope (TEM) observation of a main recording layer (granular layer) 124, a magnetic recording medium not formed with a continuous film layer 128 is also fabricated.

Using as indices various parameters of the shapes of magnetic grains in a section parallel to the main surface of the disk substrate 110, the film forming conditions of the main recording layer (granular layer) 124 are properly adjusted so that such various parameters take values within predetermined ranges, respectively. This adjustment is carried out by, for example, observing, using the transmission electron microscope, a section of a main recording layer (granular layer) 124 of a magnetic recording medium fabricated by way of trial and properly changing the film forming conditions by feedback of observation results. As various parameters of the shapes of magnetic grains, use is made of numerical values such as, for example, the half width at half maximum of a histogram of ratios (L/S) each between a long diameter (L) and a short diameter (S) of a magnetic grain, the variance of grain diameters of magnetic grains, the average grain diameter of magnetic grains, the grain density of magnetic grains, and the width of a region occupied by a nonmagnetic substance between magnetic grains.

(Evaluation)

With respect to Example 5, a histogram of ratios (L/S) is produced to calculate a half width at half maximum thereof. Further, the S/N ratio is evaluated as electromagnetic conversion characteristics of the magnetic recording medium. The S/N ratio is evaluated by actually recording and reading a signal of a predetermined pattern to measure noise.

As a result of the evaluation of the medium obtained in Example 5, it has been seen that the half width at half maximum becomes 0.3 or less as in Example 1 (FIG. 7). Further, the value of noise is 200 μV or less and thus a particularly good S/N ratio is realized.

Further, it has been confirmed that the variance of the grain diameters of the magnetic grains is 20% or less of the average grain diameter of the magnetic grains in the section of the main recording layer (granular layer) 124 taken along the plane parallel to the main surface of the disk substrate 110 (FIG. 8).

While this invention has been described in terms of the embodiments, the technical scope of the invention is not limited to the scope of the description of the above embodiments. It is obvious to a person skilled in the art that various changes or improvements can be added to the above embodiments. It is clear from the description of claims that the modes added with such changes or improvements can also be included in the technical scope of this invention.

INDUSTRIAL APPLICABILITY

This invention is suitably applicable to, for example, a substrate for a magnetic recording medium and also to a method of evaluating a magnetic recording medium including a granular layer.

BRIEF DESCRIPTION OF THE DRAWINGS

FIG. 1(a) is a sectional view showing the structure of the magnetic recording medium 10. FIG. 1(b) is a sectional view showing a detailed structure of a continuous film layer 36 in the magnetic recording medium 10.

FIG. 2(a) is a first example of a section photograph of the granular layer 32. FIG. 2(b) is a second example of a section photograph of the granular layer 32.

FIG. 3(a) is a diagram tracing the profiles of magnetic grains in part of the section photograph illustrated in FIG. 2(a). FIG. 3(b) is a diagram tracing the profiles of magnetic grains in part of the section photograph illustrated in FIG. 2(b). FIG. 3(c) is a diagram for explaining a long diameter (L) and a short diameter (S) of a magnetic grain in the section.

FIG. 4(a) is a histogram with respect to the section of the granular layer 32 illustrated in FIG. 2(a). FIG. 4(b) is a histogram with respect to the section of the granular layer 32 illustrated in FIG. 2(b).

DESCRIPTION OF SYMBOLS

Figure 1:
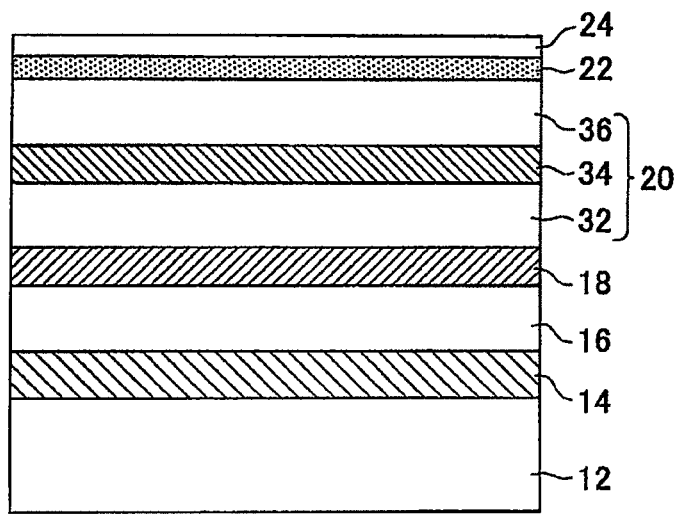
FIG. 1 shows one example of a structure of a magnetic recording medium 10 according to one embodiment of this invention.
Figure 1:
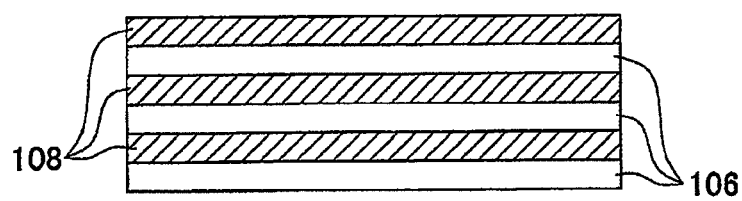
Figure 2:
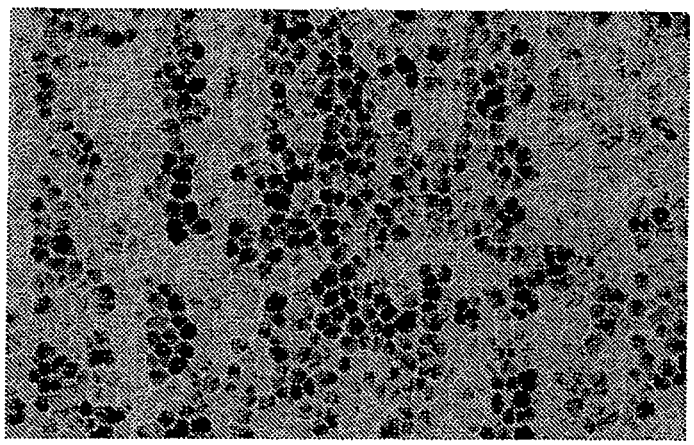
FIG. 2 shows examples each of a section of a granular layer 32 taken along the plane parallel to a main surface of a substrate 12.
Figure 2:
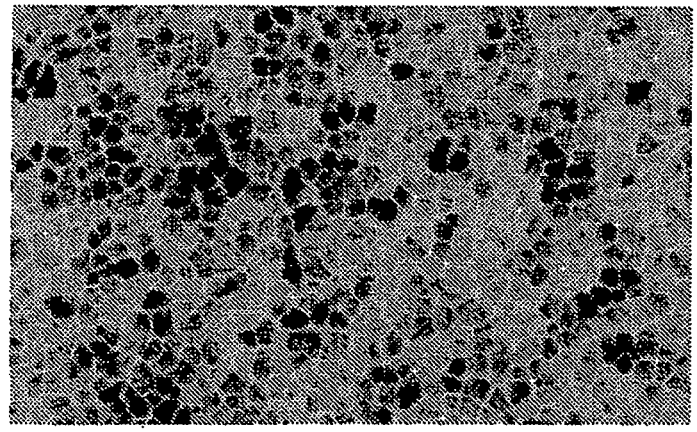
Figure 3:
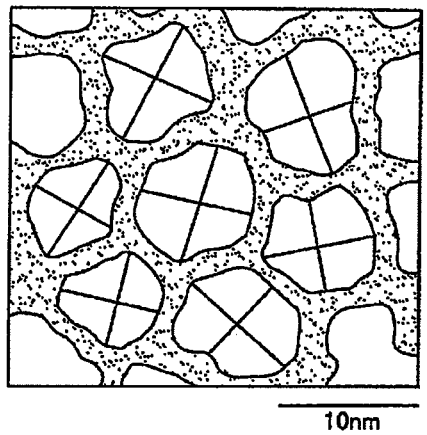
FIG. 3 shows trace diagrams of the section photographs illustrated in FIG. 2.
Figure 3:
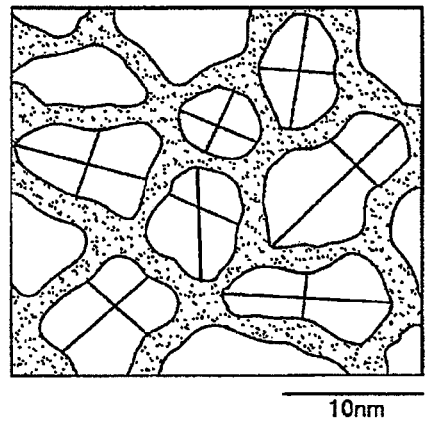
Figure 3:
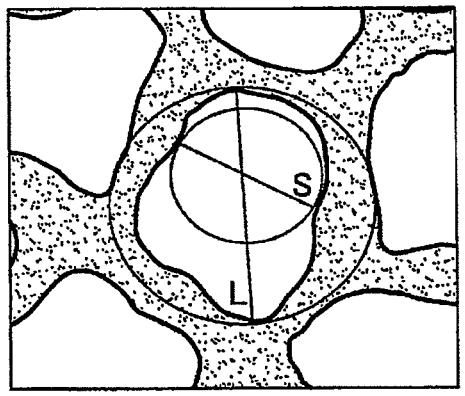
Figure 4:
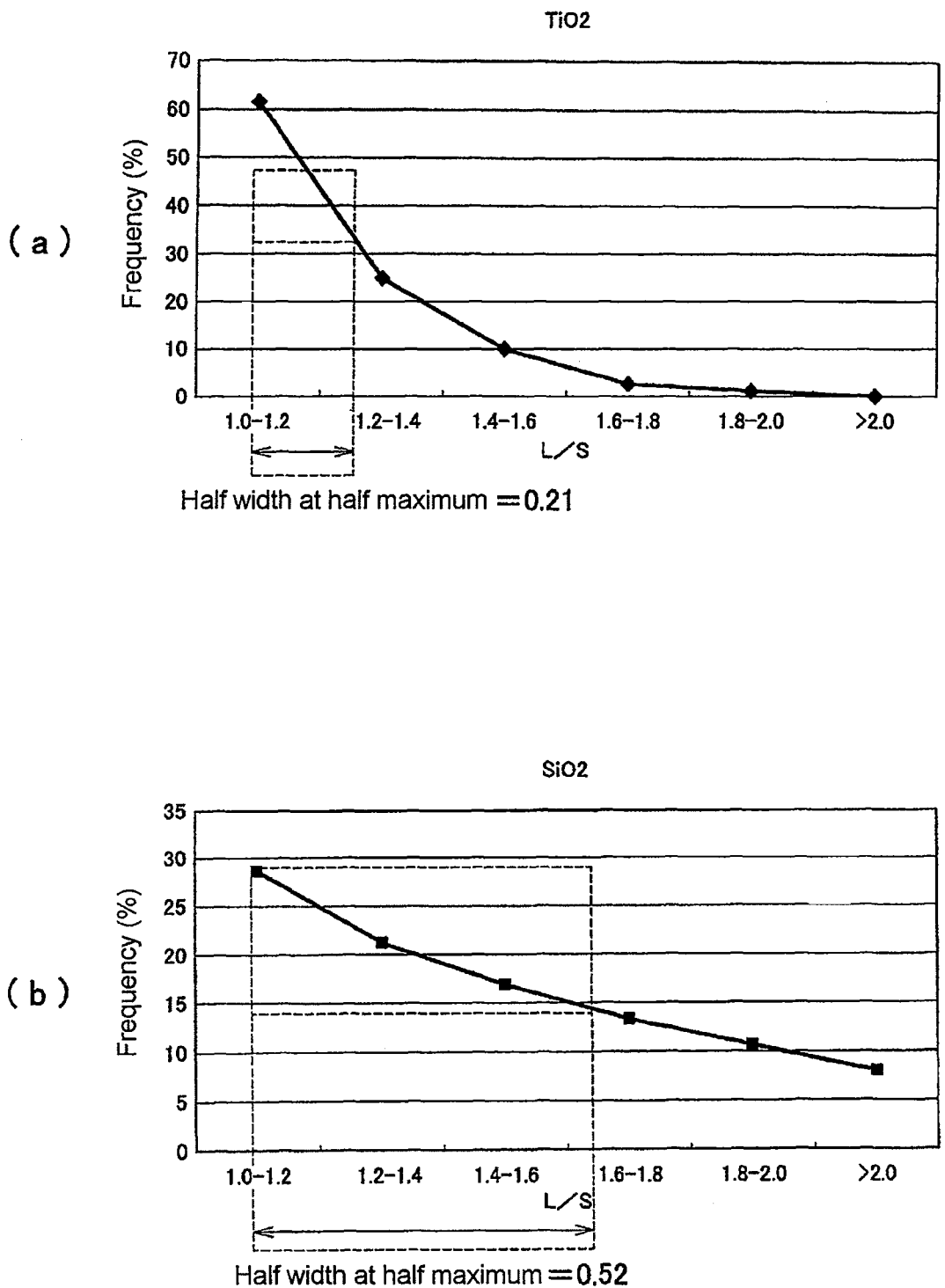
FIG. 4 shows histograms each of distribution of ratios (L/S).
Figure 5:
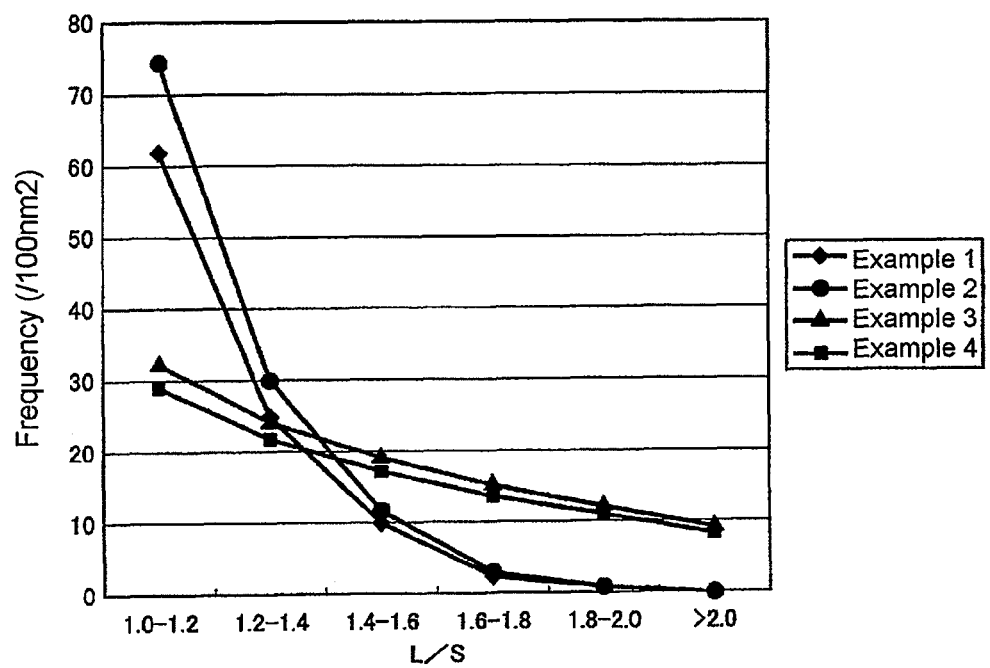
FIG. 5 is a diagram showing histograms produced with respect to Examples, respectively.
Figure 6:
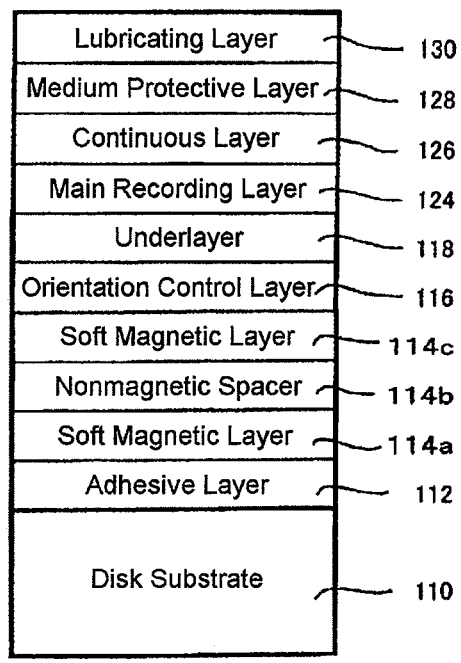
FIG. 6 is a diagram showing one example of a structure of a magnetic recording medium according to another embodiment of this invention.
Figure 7:
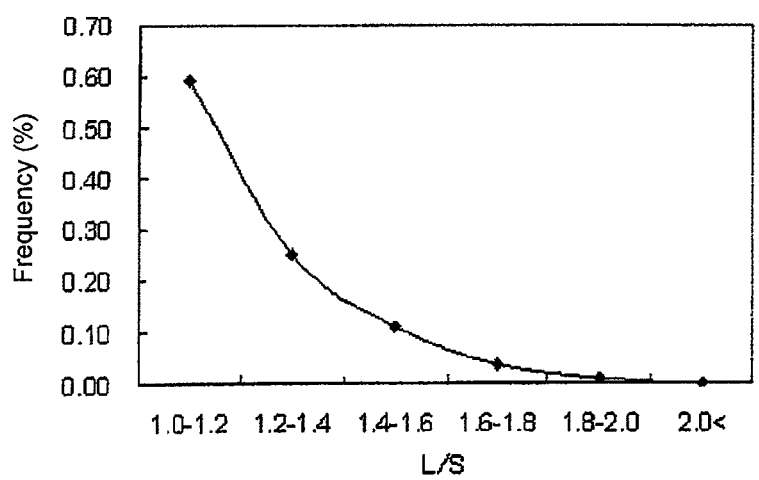
FIG. 7 is a diagram showing a histogram produced with respect to Example 5.
Figure 8:
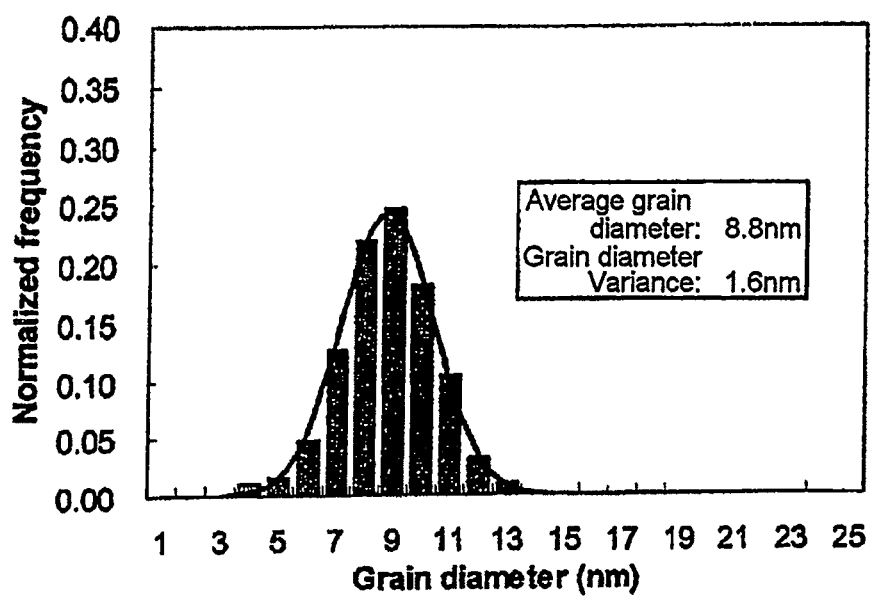
FIG. 8 is a diagram showing the variance of grain diameters of magnetic grains.

10 ... magnetic recording medium, 12 ... substrate, 14 ... adhesive layer, 16 ... soft magnetic layer, 18 ... underlayer, 20 ... magnetic recording layer, 22 ... protective layer, 24 ... lubricating layer, 32 ... granular layer (first magnetic layer), 34 ... coupling control layer, 36 ... continuous film layer, 106 ... magnetic layer (second magnetic layer), 108 ... nonmagnetic layer

The invention claimed is:

1. A magnetic recording medium comprising a substrate and a perpendicular magnetic recording layer formed over said substrate, wherein in said magnetic recording medium:
   said perpendicular magnetic recording layer comprises a magnetic layer containing magnetic grains and a nonmagnetic substance surrounding said magnetic grains in a section parallel to a main surface of said substrate,
   said magnetic layer is configured such that when, in said section, a ratio between a long diameter and a short diameter of each of said magnetic grains contained in said magnetic layer is calculated to derive a histogram of said ratios, a half width at half maximum of said histogram is 0.1 to 0.6,
   a variance of grain diameters of said magnetic grains in said section is 5 to 20% of an average grain diameter of said magnetic grains, and
   said nonmagnetic substance has a density of 4.0 g/cm$^3$ or more.

2. A magnetic recording medium according to claim 1, wherein the average grain diameter of said magnetic grains in said section is 3 to 8 nm.

3. A magnetic recording medium according to claim 1, wherein said magnetic recording layer contains said magnetic grains at the rate of 100 to 150 grains per region of 100 nm×100 nm in said section.

4. A magnetic recording medium according to claim 1, wherein a width of a region occupied by said nonmagnetic substance between said magnetic grains is 0.8 to 1.3 nm.

5. A magnetic recording medium according to claim 1, wherein:
   said perpendicular magnetic recording layer further comprises a first magnetic layer which forms said magnetic layer containing said magnetic grains and said nonmagnetic substance surrounding said magnetic grains and a second magnetic layer containing magnetic grains with grain boundaries each having a width of less than 0.8 nm.

6. A magnetic recording medium according to claim 1, wherein the nonmagnetic substance is selected from the group consisting of $ZnO$, $BaO$, $Bi_2O_3$, $Cr_3O_4$, $CuO$, $HfO_2$, $MoO_2$, $NbO_2$, $ReO_2$, $RuO_2$, $Ta_2O_5$, and $WO_2$.

7. A magnetic recording medium according to claim 1, wherein the variance of grain diameters of said magnetic grains in said section is 7 to 15% of an average grain diameter of said magnetic grains.

8. A magnetic recording medium according to claim 1, wherein the half width at half maximum of said histogram is 0.2 to 0.5.

9. A magnetic recording medium according to claim 1, wherein the half width at half maximum of said histogram is 0.3 to 0.4.

* * * * *